US009253734B2

(12) United States Patent
Chen et al.

(10) Patent No.: US 9,253,734 B2
(45) Date of Patent: Feb. 2, 2016

(54) CONTROL DEVICE AND CONTROL METHOD FOR DYNAMICALLY ADJUSTING POWER OF SMALL-CELL BASE STATIONS

(71) Applicant: Institute For Information Industry, Taipei (TW)

(72) Inventors: Li-Sheng Chen, Yilan (TW); Chih-Hsiang Ho, Taipei (TW); Wei-Ho Chung, Kaohsiung (TW); Sy-Yen Kuo, Taipei (TW)

(73) Assignee: Institute For Information Industry, Taipei (TW)

( * ) Notice: Subject to any disclaimer, the term of this patent is extended or adjusted under 35 U.S.C. 154(b) by 245 days.

(21) Appl. No.: 14/104,675

(22) Filed: Dec. 12, 2013

(65) Prior Publication Data
US 2015/0141031 A1   May 21, 2015

(30) Foreign Application Priority Data

Nov. 19, 2013   (TW) .............................. 102142029 A

(51) Int. Cl.
H04W 72/00 (2009.01)
H04W 52/24 (2009.01)
H04W 52/14 (2009.01)

(52) U.S. Cl.
CPC .......... *H04W 52/241* (2013.01); *H04W 52/244* (2013.01); *H04W 52/143* (2013.01)

(58) Field of Classification Search
None
See application file for complete search history.

(56) References Cited

U.S. PATENT DOCUMENTS

| 7,369,858 | B2 | 5/2008 | Backes et al. |
| 7,701,911 | B2 | 4/2010 | Soliman |
| 8,150,412 | B2 | 4/2012 | Cheng et al. |
| 8,412,243 | B2 | 4/2013 | Park et al. |
| 2007/0280175 | A1 | 12/2007 | Cheng et al. |
| 2009/0286496 | A1 | 11/2009 | Yavuz et al. |
| 2010/0009705 | A1 | 1/2010 | Budianu et al. |
| 2011/0003611 | A1 | 1/2011 | Haas et al. |
| 2012/0238279 | A1 | 9/2012 | Yu et al. |
| 2013/0190024 | A1 | 7/2013 | Hayase et al. |
| 2014/0106769 | A1 | 4/2014 | Bai et al. |
| 2015/0003370 | A1* | 1/2015 | Yokomakura ......... H04W 52/24 370/329 |

FOREIGN PATENT DOCUMENTS

| CN | 102111774 A | 6/2011 |
| CN | 102833793 A | 12/2012 |
| EP | 1091503 A2 | 4/2001 |
| EP | 2078343 A2 | 7/2009 |

OTHER PUBLICATIONS

Office Action to the corresponding Taiwan Patent Application No. 102142029 rendered by Taiwan Intellectual Property Office (TIPO) on Jan. 29, 2015, 6 pages.

* cited by examiner

*Primary Examiner* — Suhail Khan
(74) *Attorney, Agent, or Firm* — Skaar Ulbrich Macari, P.A.

(57) ABSTRACT

A control device and a control method for dynamically adjusting power of small-cell base stations are provided. The control device determines the number of interfered terminals of each small-cell base station according to signal quality information of terminal devices, divides the small-cell base stations into a plurality of groups, and adjusts the power of the small-cell base stations of each group in order.

20 Claims, 6 Drawing Sheets

CONTROL DEVICE AND CONTROL METHOD FOR DYNAMICALLY ADJUSTING POWER OF SMALL-CELL BASE STATIONS

PRIORITY

This application claims the benefit of priority based on Taiwan Patent Application No. 102142029 filed on Nov. 19, 2013, which is hereby incorporated by reference herein in its entirety.

FIELD

The present invention relates to a control device and a control method thereof. More particularly, the control device of the present invention divides small-cell base stations into a plurality of groups according to the number of interfered terminals of each of the small-cell base stations and adjusts power of the small-cell base stations in each of the groups in order.

BACKGROUND

With rapid development of the wireless communication industry, small-cell base stations like microcells, picocells and femtocells have been developed by the communication service providers to provide users with wider signal coverage and a better signal quality. Small-cell base stations have advantages of low power consumption, low cost and a self-organizing mechanism and so on. In addition, small-cell base stations can be used in a fourth generation (4G) mobile communication system, e.g., a worldwide interoperability for microwave access (WiMAX) system, a long term evolution (LTE) system and the like.

However, since wireless radio-frequency spectrum resources are limited and costly, small-cell base stations usually transmit signals via the same frequency bands. In such a case, signal coverage of the small-cell base stations will necessarily overlap with each other, which causes interferences with wireless signals.

Accordingly, an urgent need exists in the art to provide a power adjusting mechanism capable of dynamically adjusting power of small-cell base stations to reduce interferences on wireless signals.

SUMMARY

An objective of certain embodiments of the present invention is to provide a power adjusting mechanism, which determines the number of interfered terminals of each small-cell base station by collecting a piece of signal quality information from each terminal device of the small-cell base stations, divides the small-cell base stations into groups accordingly and adjusts power of the small-cell base stations in each of the groups in order.

To achieve the aforesaid objective, certain embodiments of the present invention include a control device for dynamically adjusting power of small-cell base stations. The control device comprises a storage, a transceiver and a processor. The transceiver is connected to the small-cell base stations. The processor is configured to execute the following steps of: (a) receiving a piece of signal quality information from each of a plurality of terminal devices via the transceiver and storing the pieces of signal quality information into the storage, wherein the terminal devices are connected to the small-cell base stations; (b) determining the number of interfered terminals of each of the small-cell base stations according to the pieces of signal quality information after the step (a); (c) dividing the small-cell base stations into a plurality of groups each having at least one of the small-cell base stations according to the number of interfered terminals of each of the small-cell base stations after the step (b), wherein each of the groups is assigned a level, and in each of the groups, the at least one of the small-cell base stations has the same number of interfered terminals; and (d) adjusting the power of the at least one of the small-cell base stations in each of the groups in order by the levels of the groups after the step (c).

Further, certain embodiments of the present invention include a control method for dynamically adjusting power of small-cell base stations. The control method is adapted for use in a control device. The control device comprises a storage, a transceiver and a processor. The transceiver is connected to the small-cell base stations. The control method is executed by the processor and comprises the following steps of: (a) receiving a piece of signal quality information from each of a plurality of terminal devices via the transceiver and storing the pieces of signal quality information into the storage, wherein the terminal devices are connected to the small-cell base stations; (b) determining the number of interfered terminals of each of the small-cell base stations according to the pieces of signal quality information after the step (a); (c) dividing the small-cell base stations into a plurality of groups each having at least one of the small-cell base stations according to the number of interfered terminals of each of the small-cell base stations after the step (b), wherein each of the groups is assigned a level, and in each of the groups, the at least one of the small-cell base stations has the same number of interfered terminals; and (d) adjusting the power of the at least one of the small-cell base stations in each of the groups in order by the levels of the groups after the step (c).

The detailed technology and preferred embodiments implemented for the subject invention are described in the following paragraphs accompanying the appended drawings for people skilled in this field to well appreciate the features of the claimed invention.

DETAILED DESCRIPTION

In the following description, the present invention will be explained with reference to example embodiments thereof. It should be appreciated that, these example embodiments are not intended to limit the present invention to any specific examples, embodiments, environment, applications or particular implementations described in these example embodiments. Therefore, description of these example embodiments is only for purpose of illustration rather than to limit the present invention, and the scope of this application shall be governed by the appended claims. In addition, in the following embodiments and attached drawings, elements unrelated to the present invention are omitted from depiction; and dimensional relationships among the individual elements in the attached drawings are illustrated only for the ease of understanding, but not to limit the actual scale.

Figure 1:
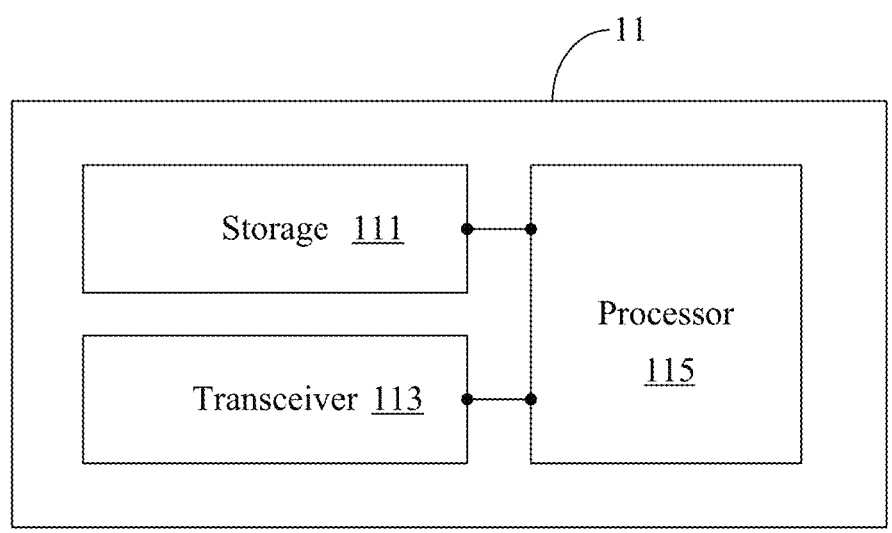
FIG. 1 depicts a control device 11 according to a first embodiment and a second embodiment of the present invention.

A first embodiment of the present invention is shown in FIG. 1, which depicts a control device 11. The control device 11 is adapted for use in a 3G or 4G mobile communication system (e.g., a WiMAX system, an LTE system and so on). The control device 11 connects with a plurality of small-cell base stations in a region and performs a power adjusting procedure to adjust the small-cell base stations in the region.

The power adjusting procedure of the present invention comprises: receiving a piece of signal quality information from each terminal device (e.g., a mobile phone, a tablet computer and any other user device with a wireless communication function) connecting with the small-cell base stations; determining the number of interfered terminal devices; dividing the small-cell base stations into groups; and adjusting the power of the small-cell base stations in each of the groups in order. In practical operations, the control device 11 may perform the power adjusting procedure to achieve dynamic adjustments when an interfered terminal of the small-cell base station is detected. It should be appreciated that, the control device 11 may be a stand-alone server or a self organizing network (SON) server in a backhaul network of a wireless communication system, a cell base station, or a small-cell base station with a high processing capability of performing the power adjusting procedure of the present invention in the region.

Specifically, the control device 11 comprises a storage 111, a transceiver 113 and a processor 115. The transceiver 113 is connected to a plurality of small-cell base stations $B_i$ in a region. Firstly, the processor 115 receives a piece of signal quality information from each of a plurality of terminal devices $T_{i,j}$ via the transceiver 113 and stores the pieces of signal quality information into the storage 111. $T_{i,j}$ represents a $j^{th}$ terminal device connected to the small-cell base station $B_i$.

It should be appreciated that, through the transceiver 113, the processor 115 may receive the signal quality information of the terminal device $T_{i,j}$ directly from the terminal device $T_{i,j}$ or via the small-cell base station $B_i$. Furthermore, the signal quality information may be, but is not limited to: a signal to interference and noise ratio (SINR), a signal to interference ratio (SIR), a carrier to interference and noise ratio (CINR), a received signal strength indicator (RSSI) and any combination thereof.

Subsequently, the processor 115 determines the number $ITN_i$ of interfered terminals of each small-cell base station $B_i$ according to the pieces of signal quality information. In detail, the processor 115 determines whether each terminal device $T_{i,j}$ of each small-cell base station $B_i$ is considerably interfered and counts the number of these interfered terminal devices. For example, for each terminal device $T_{i,j}$, the processor 115 determines whether a signal quality (e.g., SINR) is smaller than or equal to a quality threshold (e.g., 16.9 dB) and an received power from the interfering small-cell base stations (e.g., received power not from the serving small-cell base station) is greater than or equal to an interference threshold (e.g., −70 dB) according to the received signal quality information, so as to indicate that the terminal device $T_{i,j}$ is in an interfered state.

After the number $ITN_i$ of interfered terminals of each small-cell base station $B_i$ is determined, the small-cell base stations $B_i$ are divided into a plurality of groups $G_k$ according to the number $ITN_i$ of interfered terminals of each small-cell base station $B_i$. Each group $G_k$ is assigned a level k. In each group $G_k$, one or more small-cell base stations $B_i$ have the same number $ITN_i$ of interfered terminals. In this embodiment, a higher level has a smaller value of k. A small-cell base station $B_i$ in a group $G_k$ of a higher level has a greater number $ITN_i$ of interfered terminals. In other words, the number $ITN_i$ of interfered terminals of the small-cell base station $B_i$ in the group $G_k$ is larger than that of the small-cell base station $B_i$ in a group $G_{k+1}$.

Figure 2:
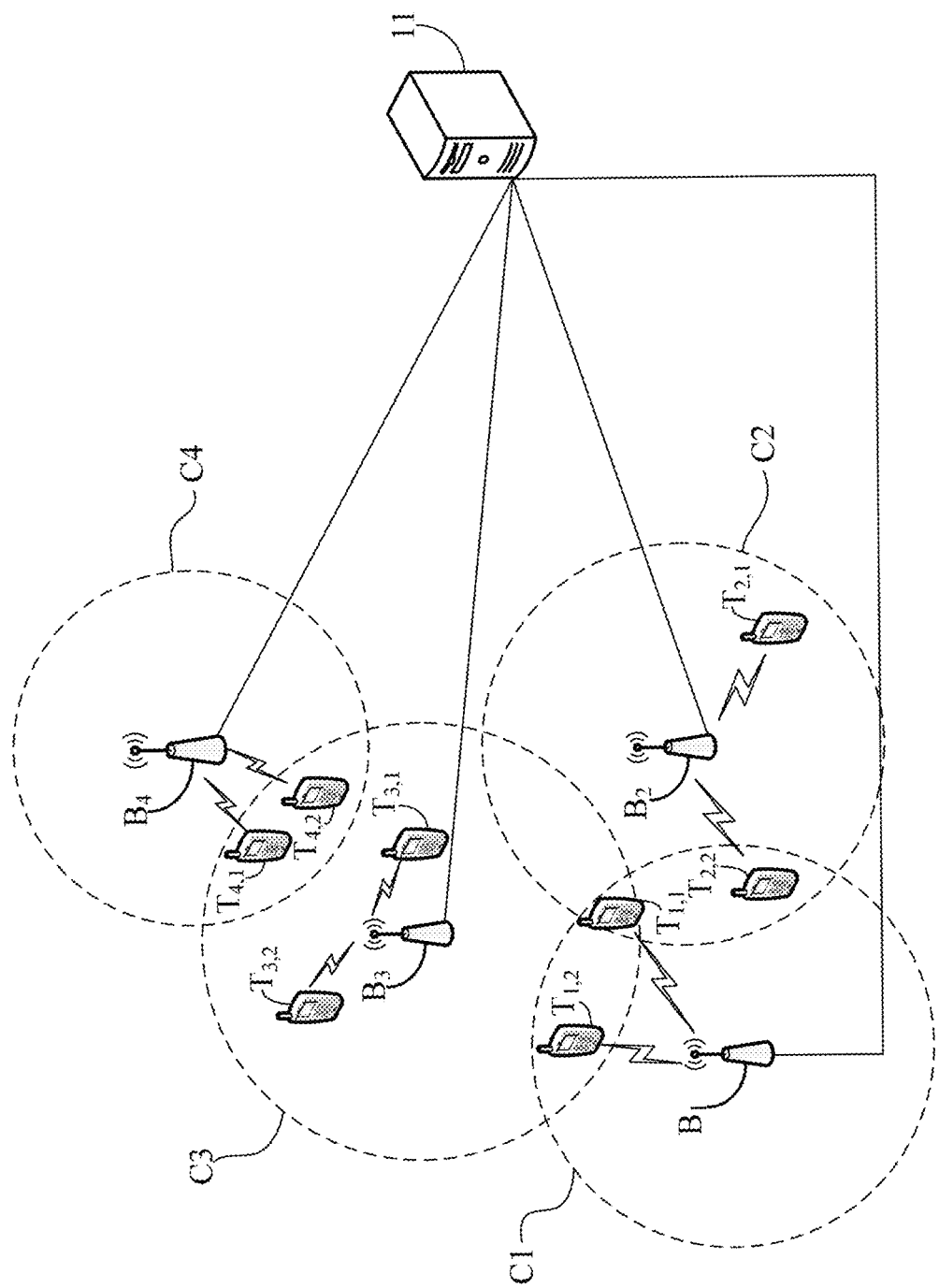
FIG. 2 depicts relationships among a plurality of small-cell base stations and terminal devices in a region and the control device 11.

For example, refer to FIG. 2, Table 1 and Table 2:

TABLE 1

| $T_{i,j}$ | Signal quality information (e.g., SINR) | Interference source receiving power (from small-cell base stations $B_i$) |
|---|---|---|
| $T_{1,1}$ | 9 dB | −68 dBm ($B_2$) |
|  |  | −62 dBm ($B_3$) |
| $T_{1,2}$ | 12 dB | −68 dBm ($B_3$) |
| $T_{2,1}$ | 13 dB | −130 dBm ($B_1$) |
|  |  | −103 dBm ($B_3$) |
| $T_{2,2}$ | 15 dB | −66 dBm ($B_1$) |
|  |  | −130 dBm ($B_3$) |
| $T_{3,1}$ | 33 dB | −130 dBm ($B_1$) |
|  |  | −125 dBm ($B_2$) |
| $T_{3,2}$ | 31 dB | −140 dBm ($B_1$) |
|  |  | −145 dBm ($B_2$) |
| $T_{4,1}$ | 13 dB | −64 dBm ($B_3$) |
| $T_{4,2}$ | 14 dB | −69 dBm ($B_3$) |

TABLE 2

| $G_k$ | $B_i$ | $ITN_i$ |
|---|---|---|
| $G_1$ | $B_1$ | 2 |
|  | $B_4$ | 2 |
| $G_2$ | $B_2$ | 1 |
| $G_3$ | $B_3$ | 0 |

The control device 11 connects to the small-cell base stations $B_1$, $B_2$, $B_3$ and $B_4$. The small-cell base station $B_1$ has a signal coverage C1. Terminal devices $T_{1,1}$ and $T_{1,2}$ within the signal coverage C1 is connected to the small-cell base station $B_1$. The small-cell base station $B_2$ has a signal coverage C2. Terminal devices $T_{2,1}$ and $T_{2,2}$ within the signal coverage C2 is connected to the small-cell base station $B_2$. The small-cell base station $B_3$ has a signal coverage C3. Terminal devices $T_{3,1}$ and $T_{3,2}$ within the signal coverage C3 is connected to the small-cell base station $B_3$. The small-cell base station $B_4$ has a signal coverage C4. Terminal devices $T_{4,1}$ and $T_{4,2}$ within the signal coverage C4 is connected to the small-cell base station $B_4$.

In this embodiment, the terminal devices $T_{1,1}$, $T_{1,2}$, $T_{2,2}$, $T_{4,1}$ and $T_{4,2}$ are in an interfered state. Therefore, the number $ITN_1$ of interfered terminals of the small-cell base station $B_1$ is 2, the number $ITN_2$ of interfered terminals of the small-cell base station $B_2$ is 1, the number $ITN_3$ of interfered terminals of the small-cell base station $B_3$ is 0, and the number $ITN_4$ of interfered terminals of the small-cell base station $B_4$ is 2. Since the number $ITN_1$ of interfered terminals of the small-cell base station $B_1$ and the number $ITN_4$ of interfered terminals of the small-cell base station $B_4$ are the same and the largest, the small-cell base stations $B_1$ and $B_4$ have the level 1 and both belong to a group $G_1$. The small-cell base station $B_2$ has the second largest number $ITN_2$ of interfered terminals, so the small-cell base station $B_2$ has the level 2 and belongs to a group $G_2$. The number $ITN_3$ of interfered terminals of the small-cell base station $B_3$ is the smallest, so the small-cell base station $B_3$ has the level 3 and belongs to a group $G_3$.

After the small-cell base stations $B_i$ are divided into groups $G_k$, the processor 115 adjusts the power of the small-cell base stations $B_i$ in each group $G_k$ in order by the levels of the groups $G_k$. Taking FIG. 2 as an example for illustration, the processor 115 adjusts firstly the small-cell base stations $B_1$ and $B_4$, then the small-cell base station $B_2$ and finally the small-cell base station $B_3$. How to adjust the power of the small-cell base stations $B_i$ in each group $G_k$ according to the present invention will be further described hereinafter.

It should be appreciated that, there are some restrictions for the power adjusting mechanism of the present invention to adjust the power of the small-cell base stations $B_i$. For each group $G_k$, the processor 115 stops adjusting the power once one of the following conditions is happened during adjustment of the power of the small-cell base stations $B_i$ (whether the power is being "raised" or "lowered"). In other words, if the processor 115 decides to raise or to lower the power of the small-cell base station $B_i$, the power will be raised or lowered gradually until one of the following conditions is happened.

(1) the power adjusted has reached a maximum power or a minimum power;

(2) there is no improvement on an average signal quality of interfered terminals (i.e. the average signal quality of interfered terminals stops improving), for example, the average signal quality of interfered terminals is obtained by dividing the sum of the signal quality information (e.g., SINR) of the interfered terminal devices $T_{i,j}$ by the total number of interfered terminal devices $T_{i,j}$ (i.e., the sum of $ITN_i$));

(3) a connection level (e.g., a modulation level or quality of service (QoS)) of one of the terminal devices becomes lowered; and (4) one of the terminal devices which is in an un-interfered changes into an interfered state.

Firstly, the processor 115 determines which small-cell base stations $B_i$ in each group $G_k$ are adjacent to each other. For non-adjacent small-cell base stations $B_i$ in each group $G_k$, the processor 115 adjusts the power of the non-adjacent base stations $B_i$ simultaneously, and decides whether to raise or to lower the power by comparing an average signal quality of interfered terminals after the power is raised with that after the power is lowered. In detail, the processor 115 tries to raise the original power of the small-cell base station $B_i$ by at least one unit. Then, the processor 115 receives a piece of signal quality information from each of the terminal devices $T_{i,j}$ again via the transceiver 113 to obtain the average signal quality of interfered terminals.

Then, the processor 115 tries to lower the original power of the small-cell base station $B_i$ by at least one unit. Subsequently, the processor 115 receives a piece of signal quality information from each of the terminal devices $T_{i,j}$ again via the transceiver 113 to obtain the average signal quality of interfered terminals. Accordingly, by comparing the average signal quality of interfered terminals after the power is raised with the average signal quality of interfered terminals after the power is lowered, the processor 115 can decide whether to raise or to lower the power to reduce signal interferences. After deciding to raise or to lower the power, the processor 115 adjusts the power gradually until one of the aforesaid conditions is happened.

For each of the adjacent small-cell base stations $B_i$ in each group $G_k$, the processor 115 adjusts the power of the adjacent small-cell base stations $B_i$ in order according to a degree of influence. Then, the average signal quality of interfered terminals after the power is raised is compared with the average signal quality of interfered terminals after the power is lowered to decide whether to raise or to lower the power. For example, by comparing influences of power adjustments of the adjacent small-cell base stations $B_i$ on the overall average signal quality of interfered terminals or on the modulation level or QoS level of $T_{i,j}$, the processor 115 may firstly adjust the small-cell base station $B_i$ having a higher degree of influence.

Similarly, the processor 115 tries to raise the original power of the small-cell base station $B_i$ by at least one unit to obtain the average signal quality of interfered terminals, and to lower the original power of the small-cell base station $B_i$ by at least one unit to obtain an average signal quality of interfered terminals. Then, the processor 115 compares the average signal quality of interfered terminals after the power is raised with the average signal quality of interfered terminals after the power is lowered to decide whether to raise or to lower the power to reduce signal interferences. Likewise, after deciding to raise or to lower the power, the processor 115 adjusts the power gradually until one of the aforesaid conditions is happened.

It should be appreciated that, in the above descriptions, the processor 115 decides to raise or to lower the power by trying firstly to raise the power and then lower the power to obtain the interfered terminal average signal qualities. However, the processor 115 may also decide to raise or to lower the power by trying firstly to lower the power and then raise the power to obtain the interfered terminal average signal qualities. Therefore, the case in which the processor 115 tries firstly to raise the power or to lower the power is not intended to limit the scope of the present invention.

Furthermore, for the group $G_k$ in which the number $ITN_i$ of interfered terminals of the small-cell base station $B_i$ is zero, the processor 115 lowers the power of the small-cell base station $B_i$ until one of the aforesaid conditions is happened.

Figure 3:
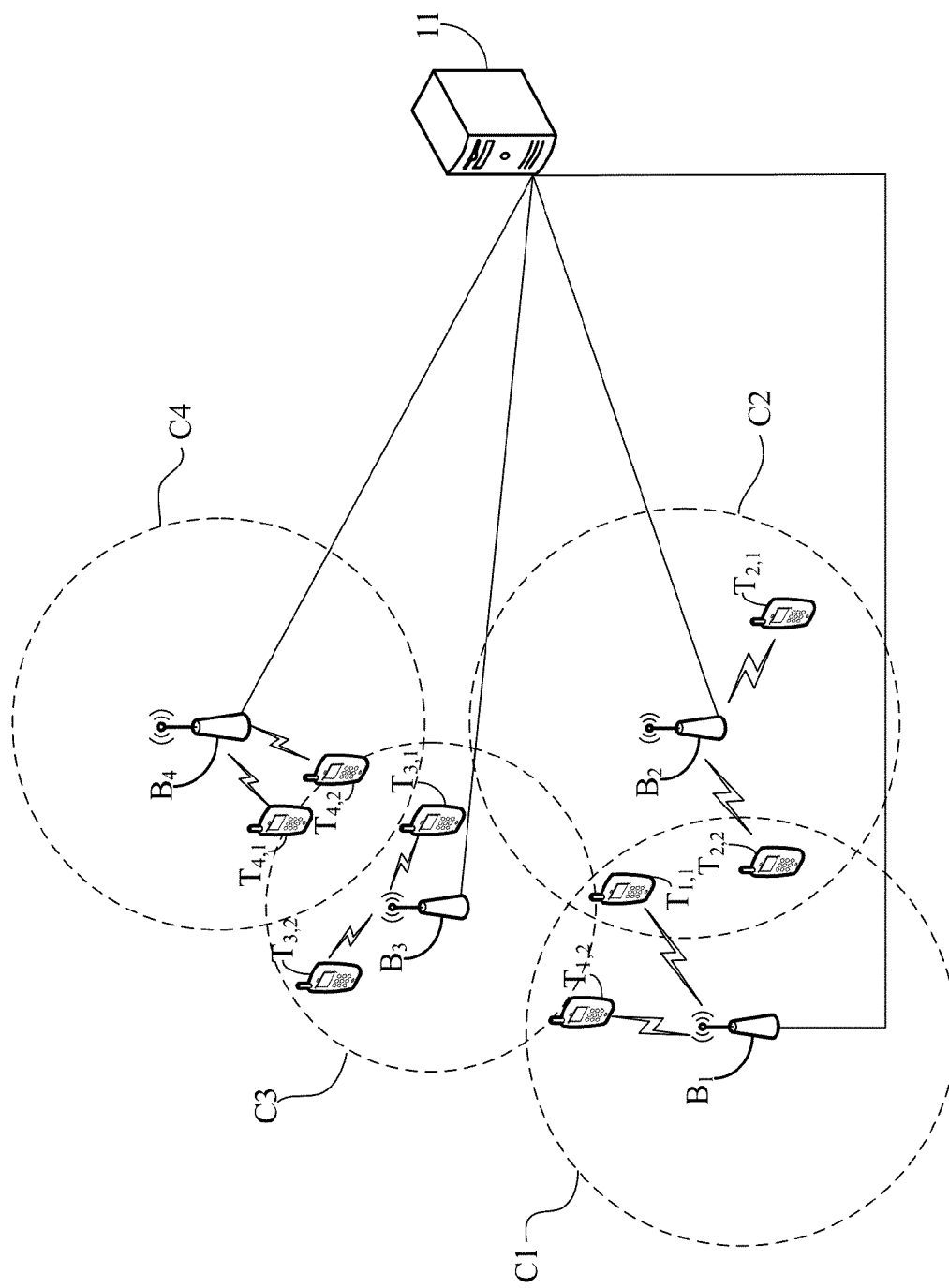
FIG. 3 depicts signal coverage of small-cell base stations of which the power has been adjusted.

Please refer to FIGS. 2 and 3. For example, the processor 115 determines that the small-cell base stations $B_1$, $B_4$ of the group $G_1$ are not adjacent to each other, and thus adjusts the two small-cell base stations simultaneously. Subsequently, the processor 115 decides that the power of the small-cell base stations $B_1$, $B_4$ of the group $G_1$ needs to be raised by comparing the average signal quality of interfered terminals after the power is raised with the average signal quality of interfered terminals after the power is lowered. Then, the power is raised gradually until one of the aforesaid conditions is happened. The signal coverage C1, C4 after the power is raised is just as shown in FIG. 3. Then, with a similar procedure, the processor 115 decides to raise the power of the small-cell base station $B_2$ of the group $G_2$, and the power is raised gradually until one of the aforesaid conditions is happened. The signal coverage C2 after the power is raised is also as shown in FIG. 3. Since the number $ITN_3$ of interfered terminals of the small-cell base station $B_3$ in the group $G_3$ is zero, the processor 115 lowers the power of the small-cell base station $B_3$ gradually until one of the aforesaid conditions is happened.

A second embodiment of the present invention is also shown in FIG. 1. Different from the first embodiment, the power adjusting procedure of this embodiment of the present invention further determines whether an improvement is achieved through the power adjustment after the number of interfered terminal devices is determined and before the small-cell base stations are divided into groups.

Specifically, the processor 115 determines whether a difference on average signal quality of interfered terminals is greater than an improving threshold. The difference on average signal quality of interfered terminals is obtained by subtracting a previous average signal quality of interfered terminals from a current average signal quality of interfered terminals. If the difference on average signal quality of interfered terminals is greater than or equal to an improving threshold, then the processor 115 proceeds to dividing the small-cell base stations into groups as described in the first embodiment. If the difference on the average signal quality of interfered terminals is smaller than the improving threshold, then a count value is increased, and the processor 115 determines whether the count value incremented is greater than a count threshold. If the count value is smaller than or equal to the count threshold, then the processor 115 proceeds to dividing the small-cell base stations into groups. Otherwise, if the count value is greater than the count threshold, then the processor 115 sets the count value to be zero and the returns to the first step of the power adjusting procedure to receive a piece of signal quality information from each of the terminal devices.

Figure 4:
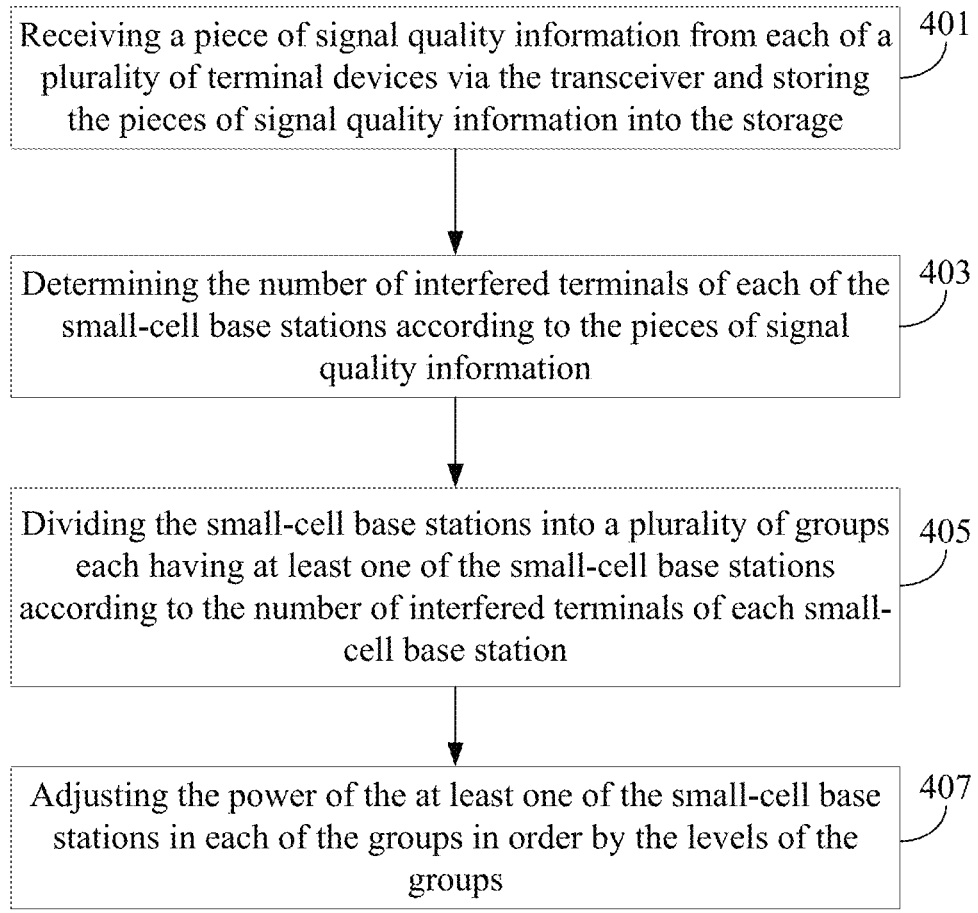
FIGS. 4 and 5 are a flowchart diagram of a control method according to a third embodiment of the present invention.

A third embodiment of the present invention is a control method for dynamically adjusting power of small-cell base stations, a flowchart diagram of which is shown in FIG. 4. The control method of the present invention is executed by a processor of a control device (e.g., the processor 115 of the control device 11 described in the aforesaid embodiments). In addition to the processor, the control device also has a transceiver and a storage. The processor is electrically connected to the transceiver and the storage. The transceiver is connected to the small-cell base stations.

Firstly, step 401 is executed to receive a piece of signal quality information from each of a plurality of terminal devices via the transceiver and store the pieces of signal quality information into the storage. The terminal devices are connected to the small-cell base stations. Then, step 403 is executed to determine the number of interfered terminals of each of the small-cell base stations according to the pieces of signal quality information. Afterwards, step 405 is executed to divide the small-cell base stations into a plurality of groups each having at least one of the small-cell base stations according to the number of interfered terminals of each small-cell base station. Each of the groups is assigned a level. In each of the groups, the at least one of the small-cell base stations has the same number of interfered terminals. Finally, step 407 is executed to adjust the power of the at least one small-cell base station in each of the groups in order by the levels of the groups.

Figure 5:
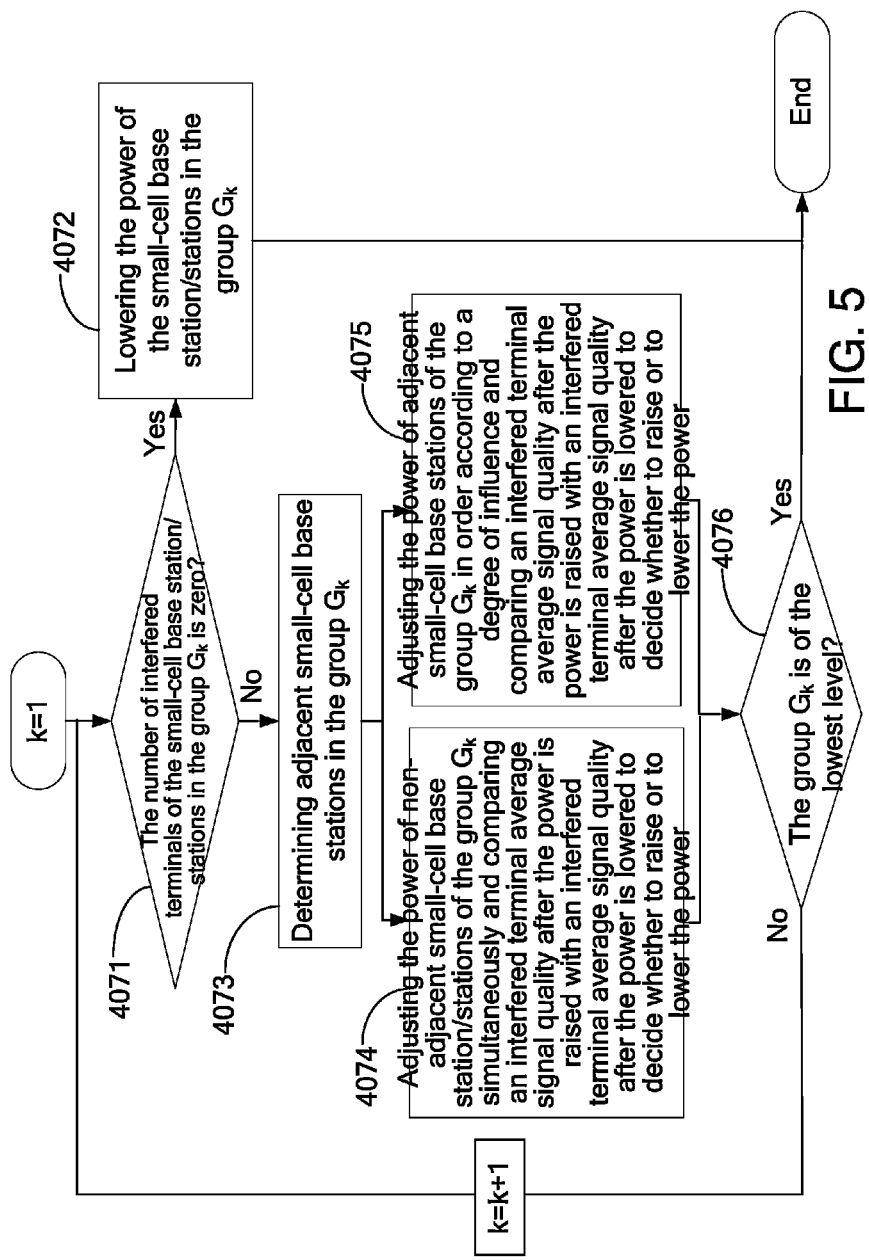

Specifically, the step 407 further comprises steps shown in FIG. 5. Firstly, starting from the group $G_k$ of the highest level (i.e., k=1), step 4701 is executed to determine whether the number of interfered terminals of the small-cell base station/stations in the group $G_k$ is zero. If yes, then step 4072 is executed to lower the power of the small-cell base station/stations in the group $G_k$, and the step 407 ends up after the step 4072. Otherwise, step 4073 is executed to determine adjacent small-cell base stations in the group $G_k$.

Then, steps 4074 and 4075 are executed. Step 4074 is executed to adjust the power of the non-adjacent small-cell base station/stations in the group $G_k$ simultaneously, and compare an average signal quality of interfered terminals after the power is raised with an average signal quality of interfered terminals after the power is lowered to decide whether to raise or to lower the power. Step 4075 is executed to adjust the power of the adjacent small-cell base stations in the group $G_k$ in order according to a degree of influence, and compare an average signal quality of interfered terminals after the power is raised with an average signal quality of interfered terminals after the power is lowered to decide whether to raise or to lower the power. Afterwards, step 4706 is executed to determine whether the group $G_k$ is of the lowest level. If yes, then the step 407 ends up. Otherwise, then the level k is increased by 1 and the process returns to the step 4701.

In addition to the aforesaid steps, the control method of this embodiment can also execute all the operations and functions set forth in the first embodiment. How this embodiment executes these operations and functions will be readily appreciated by those of ordinary skill in the art based on the explanation of the first embodiment, and thus will not be further described herein.

Figure 6:
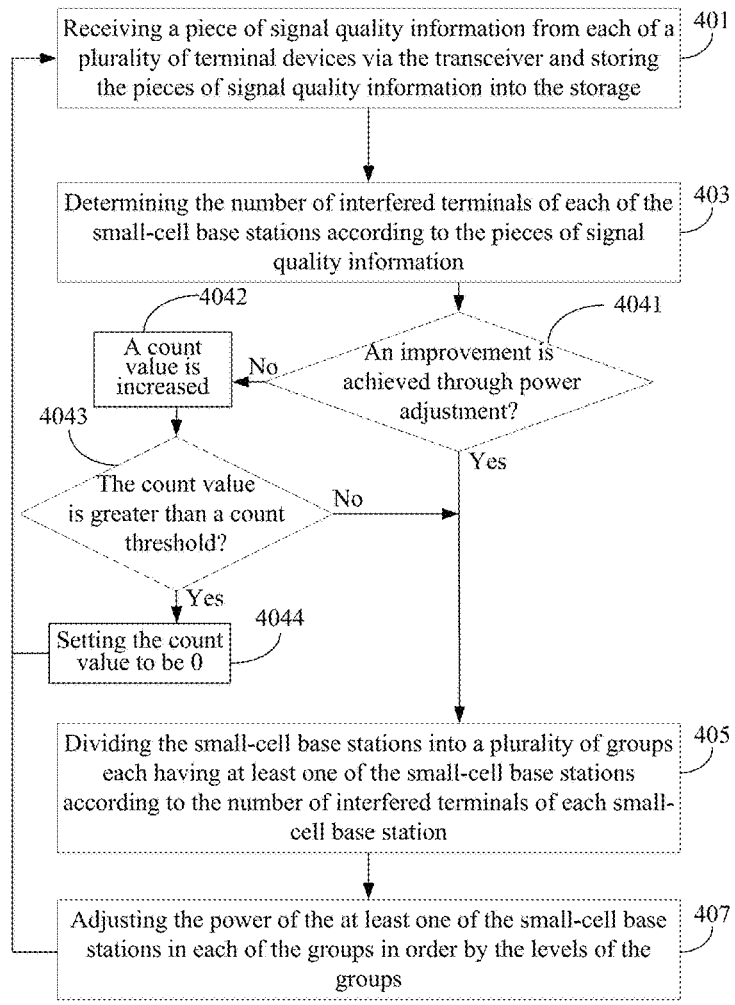
FIG. 6 is a flowchart diagram of a control method according to a fourth embodiment of the present invention.

A fourth embodiment of the present invention is a control method for dynamically adjusting power of small-cell base stations, a flowchart diagram of which is shown in FIG. 6. Different from the third embodiment, steps 4041, 4042, 4043 and 4044 are further comprised in this embodiment between the steps 403 and 405, and the process returns to the step 401 after the step 407.

Step 4041 is executed to determine whether an improvement is achieved through the power adjustment. In detail, the step 4041 is to determine whether a difference on average signal quality of interfered terminals is greater than an improving threshold. The difference on average signal quality of interfered terminals is obtained by subtracting a previous average signal quality of interfered terminals from a current average signal quality of interfered terminals. If the difference on average signal quality of interfered terminals is greater than or equal to an improving threshold, then it indicates that there is still room for improvement, and the process proceeds to the step 405. On the other hand, if the difference on average signal quality of interfered terminals is smaller than the improving threshold, then it indicates that there is no room for improvement. In this case, the step 4042 is executed to increase a count value (an initial value of which usually is 0). Then the step 4043 is executed to determine whether the count value is greater than a count threshold. If the count value is not greater than the count threshold, then the process proceeds to the step 405. If the count value is greater than the count threshold, then the step 4044 is executed to set the count threshold to be 0, and then the process returns to the step 401.

In addition to the aforesaid steps, the control method of this embodiment can also execute all the operations and functions set forth in the second embodiment. How this embodiment executes these operations and functions will be readily appreciated by those of ordinary skill in the art based on the explanation of the second embodiment, and thus will not be further described herein.

According to the above descriptions, the present invention provides a power adjusting mechanism, which collects a piece of signal quality information from each terminal device of small-cell base stations to determine the number of interfered terminal devices within the signal coverage of each small-cell base station and divides the small-cell base stations into groups accordingly. Through the division, power adjustments are made preferentially on the small-cell base stations which have more terminal devices interfered within the signal coverage so as to improve the signal quality of the entire network. In this way, a dynamic adjustment can be achieved by executing the power adjusting procedure of the present invention periodically or continuously.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A control device for dynamically adjusting power of small-cell base stations, comprising:
   a storage;
   a transceiver connected to the small-cell base stations; and
   a processor, being configured to execute the following steps of:
   (a) receiving a piece of signal quality information from each of a plurality of terminal devices via the transceiver and storing the pieces of signal quality information into the storage, wherein the terminal devices are connected to the small-cell base stations;
   (b) determining a number of interfered terminals of each of the small-cell base stations according to the pieces of signal quality information after the step (a);
   (c) dividing the small-cell base stations into a plurality of groups each having at least one of the small-cell base stations according to the number of interfered terminals of each of the small-cell base stations after the step (b), wherein each of the groups is assigned a level, and in each of the groups, the at least one of the small-cell base stations has the same number of interfered terminals; and
   (d) adjusting the power of the at least one of the small-cell base stations in each of the groups in order by the levels of the groups after the step (c).

2. The control device as claimed in claim 1, wherein for each of the groups, the step (d) further comprises the following step of:
   adjusting the power of at least one non-adjacent small-cell base station simultaneously.

3. The control device as claimed in claim 2, wherein for the at least one non-adjacent small-cell base station in each of the groups, the step (d) further comprises the following step of:
   comparing an average signal quality of interfered terminals after the power is raised with an average signal quality of interfered terminals after the power is lowered to decide whether to raise or to lower the power.

4. The control device as claimed in claim 1, wherein for each of the groups, the step (d) further comprises the following step of:
   adjusting the power of adjacent small-cell base stations in order according to a degree of influence.

5. The control device as claimed in claim 4, wherein for each of the adjacent small-cell base stations in each of the groups, the step (d) further comprises the following step of:
   comparing an average signal quality of interfered terminals after the power is raised with an average signal quality of interfered terminals after the power is lowered to decide whether to raise or to lower the power.

6. The control device as claimed in claim 1, wherein the step (d) further comprises the following step of:
   for the group in which the number of interfered terminals of the at least one of the small-cell base stations is zero, lowering the power of the at least one of the small-cell base stations.

7. The control device as claimed in claim 1, wherein for each of the groups, the step (d) further comprises the following step of:
   adjusting the power of the at least one of the small-cell base stations until one of the following conditions is happened:
   the power adjusted has reached a maximum power or a minimum power;
   an average signal quality of interfered terminals stops improving;
   a connection level of one of the terminal devices becomes lowered; and
   one of the terminal devices which is in an un-interfered state changes into an interfered state.

8. The control device as claimed in claim 1, wherein the step (b) further comprises the following step of:
   for each of the terminal devices, determining that a signal quality is smaller than or equal to a quality threshold and an interference source receiving power is greater than or equal to an interference threshold according to the pieces of received signal quality information to indicate that the terminal device is in an interfered state.

9. The control device as claimed in claim 1, wherein the processor further executes the following step after the step (b) and before the step (c):
   determining whether a difference on average signal quality is greater than an improving threshold;
   wherein the difference on average signal quality is obtained by subtracting a previous average signal quality of interfered terminals from a current average signal quality of interfered terminals, and if the difference on average signal quality of interfered terminals is greater than the improving threshold, then the step (c) is executed; and
   if the difference on average signal quality of interfered terminals is smaller than the improving threshold, then a count value is increased, and the processor further determines whether the count value is greater than a count threshold, and wherein if the count value is smaller than the count threshold, then the step (c) is executed, and if the count value is greater than the count threshold, then the count value is set to be zero and the processor returns to execute the step (a);
   wherein, the processor returns to execute the step (a) after the step (d).

10. The control device as claimed in claim 1, wherein each of the pieces of signal quality information comprises at least one of a signal to interference and noise ratio (SINR), a signal to interference ratio (SIR), a carrier to interference and noise ratio (CINR) and a received signal strength indicator (RSSI).

11. A control method adapted for use in a control device for dynamically adjusting power of small-cell base stations, the control device comprising a storage, a transceiver and a processor, the transceiver connecting to the small-cell base stations, and the control method being executed by the processor and comprising the steps of:
   (a) receiving a piece of signal quality information from each of a plurality of terminal devices via the transceiver and storing the pieces of signal quality information into the storage, wherein the terminal devices are connected to the small-cell base stations;
   (b) determining a number of interfered terminals of each of the small-cell base stations according to the pieces of signal quality information after the step (a);
   (c) dividing the small-cell base stations into a plurality of groups each having at least one of the small-cell base stations according to the number of interfered terminals of each of the small-cell base stations after the step (b), wherein each of the groups is assigned a level, and in each of the groups, the at least one of the small-cell base stations has the same number of interfered terminals; and
   (d) adjusting the power of the at least one of the small-cell base stations in each of the groups in order by the levels of the groups after the step (c).

12. The control method as claimed in claim 11, wherein the step (d) further comprises the step of:
adjusting the power of at least one non-adjacent small-cell base station in each of the groups simultaneously.

13. The control method as claimed in claim 12, wherein for the at least one non-adjacent small-cell base station in each of the groups, the step (d) further comprises the step of:
comparing an average signal quality of interfered terminals after the power is raised with an average signal quality of interfered terminals after the power is lowered to decide whether to raise or to lower the power.

14. The control method as claimed in claim 11, wherein for each of the groups, the step (d) further comprises the step of:
adjusting the power of adjacent small-cell base stations in order according to a degree of influence.

15. The control method as claimed in claim 14, wherein for each of the adjacent small-cell base stations in each of the groups, the step (d) further comprises the step of:
comparing an average signal quality of interfered terminals after the power is raised with an average signal quality of interfered terminals after the power is lowered to decide whether to raise or to lower the power.

16. The control method as claimed in claim 11, wherein the step (d) further comprises the step of:
for the group in which the number of interfered terminals of the at least one of the small-cell base stations is zero, lowering the power of the at least one of the small-cell base stations.

17. The control method as claimed in claim 11, wherein for each of the groups, the step (d) further comprises the step of:
adjusting the power of the at least one small-cell base station until one of the following conditions is happened:
the power adjusted has reached a maximum power or a minimum power;
an average signal quality of interfered terminals stops improving;
a connection level of one of the terminal devices becomes lowered; and
one of the terminal devices which is in an un-interfered state changes into an interfered state.

18. The control method as claimed in claim 11, wherein the step (b) further comprises the step of:
for each of the terminal devices, determining that a signal quality is smaller than or equal to a quality threshold and a interference source receiving power is greater than or equal to an interference threshold according to the pieces of received signal quality information to indicate that the terminal device is in an interfered state.

19. The control method as claimed in claim 11, further comprising the following step after the step (b) and before the step (c):
determining whether a difference on average signal quality is greater than an improving threshold;
wherein the difference on average signal quality is obtained by subtracting a previous average signal quality of interfered terminals from a current average signal quality of interfered terminals, and if the difference on average signal quality of interfered terminals is greater than the improving threshold, then the step (c) is executed; and
if the difference on average signal quality of interfered terminals is smaller than the improving threshold, then a count value is increased, and whether the count value is greater than a count threshold is further determined, and wherein if the count value is smaller than the count threshold, then the step (c) is executed, and if the count value is greater than the count threshold, then the count value is set to be zero and the method returns to the step (a);
wherein, the method returns to the step (a) after the step (d).

20. The control method as claimed in claim 11, wherein each of the pieces of signal quality information comprises at least one of a signal to interference and noise ratio (SINR), a signal to interference ratio (SIR), a carrier to interference and noise ratio (CINR) and a received signal strength indicator (RSSI).

* * * * *